United States Patent
Benedict

(10) Patent No.: US 6,930,302 B2
(45) Date of Patent: Aug. 16, 2005

(54) METHOD AND APPARATUS FOR SCANNING AN OPTICAL BEAM USING AN OPTICAL CONDUIT

(75) Inventor: George Benedict, Fremont, CA (US)

(73) Assignee: Thomas Hiramatsu-Tie, Concord, CA (US)

( * ) Notice: Subject to any disclaimer, the term of this patent is extended or adjusted under 35 U.S.C. 154(b) by 0 days.

(21) Appl. No.: 10/937,593

(22) Filed: Sep. 9, 2004

(65) Prior Publication Data

US 2005/0029439 A1 Feb. 10, 2005

Related U.S. Application Data

(62) Division of application No. 10/624,791, filed on Jul. 21, 2003.

(51) Int. Cl.[7] .............................. H01J 3/14; H01J 40/14; H01J 5/16
(52) U.S. Cl. ........................... 250/234; 250/548; 345/8; 355/67
(58) Field of Search ............................ 250/227.11, 234; 250/548; 358/484; 345/8–9, 156, 161; 355/67; 356/399–401

(56) References Cited

U.S. PATENT DOCUMENTS

| | | | |
|---|---|---|---|
| 3,389,950 A | 6/1968 | Harper | |
| 5,103,497 A | 4/1992 | Hicks | |
| 5,590,457 A | 1/1997 | Ninchi | |
| 5,808,472 A | 9/1998 | Hayes | |
| 6,100,961 A | * 8/2000 | Shiraishi et al. | ............... 355/67 |
| 6,157,863 A | 12/2000 | Chandler et al. | |
| 6,294,775 B1 | 9/2001 | Seibel et al. | |
| 6,550,918 B1 | 4/2003 | Agostinelli et al. | |

* cited by examiner

Primary Examiner—David Porta
Assistant Examiner—Patrick J. Lee
(74) Attorney, Agent, or Firm—Kenta Suzue; Haynes Beffel & Wolfeld LLP

(57) ABSTRACT

Methods and apparatuses for scanning of optical beams are disclosed. A beam is optically coupled to an optical conduit, and the optical conduit is made to bend. A set of positions of the optical conduit is measured and the optical conduit is bent. The properties of the exiting light beam are determined by the optical conduit and the bending of the optical conduit, thereby scanning the beam.

13 Claims, 23 Drawing Sheets

METHOD AND APPARATUS FOR SCANNING AN OPTICAL BEAM USING AN OPTICAL CONDUIT

REFERENCE TO RELATED APPLICATION

This application is a divisional of U.S. application Ser. No. 10/624,791, filed 21 Jul. 2003, and entitled "Method and Apparatus for Scanning an Optical Beam Using an Optical Conduit," by George Benedict, and assigned to the assignee of the present invention.

BACKGROUND OF THE INVENTION

Optical beam scanners are commonly made using one or more mechanical devices to rotate and/or translate an optical element, such as a mirror, that scans, i.e. produces a controlled deflection of the path of an optical beam. Optical elements are those elements that come in contact with the optical beam and may influence the subsequent optical path of the optical beam such as mirrors, lenses, prisms, diffraction gratings, optical conduits, windows, gradient index of refraction materials, acousto-optic and electro-optic materials, and various liquids and gasses including the ocean and the atmosphere. Herein, optical beams, beams, and light, refer not only to waves in the visible spectrum but also to any electromagnetic waves.

Mirrors rotating about an axis defined by a spindle, or torsion bar, are called galvanometer scanners. In the galvanometer scanner, a motor device is typically used employing a magnetic field and magnets to rotate a spindle or twist a torsion bar. A capacitance sensor or an optical sensor is typically used to measure a rotation angle of the spindle or torsion bar. It is useful, in many galvanometer scanner applications, to use a servo to control the angle of the desired beam deflection using the sensor information for the actual beam deflection. Two galvanometer scanners are typically used to deflect a beam in two dimensions.

More recently MEMS (micro electro-mechanical systems) mirrors are used to deflect a beam in two dimensions resulting in a compound angle (for example U.S. Pat. No. 6,538,799) with electric field and/or magnetic field actuators used to induce motion in the mirrors. Again capacitance or optical sensors are used to determine the actual position of the mirror defined as the compound angle of the mirror normal vector.

Mirror based optical scanners work best when the beam that is to be scanned has a small angular spread. The angular spreading of the beam can be expressed as the divergence, $\theta_{1/2}$ (where $\theta_{1/2}$ is the half angle of the beam divergence and is defined as the ratio of the beam radius to the effective focal length). As shown in FIG. 1, a substantially large range of positions on the screen 140, may be scanned using the rotating scan mirror 150, with this small divergence beam 120, which is made by lens 130, collecting the light from a light source 110.

It would be desirable in many applications to have a mirror based optical scanner than can address a substantially large range of positions, that could be used with large divergence beams. However, as shown in FIG. 2 with a large divergence beam 220, which is formed from the light source 2 10, the performance of the rotating scan mirror 250, is limited in scan angle as observed at the screen 240.

In both FIG. 1 and FIG. 2, the scanned beam is not in-line with the original beam. In order to have the scanned beam in-line at least in the same direction with the original beam, another either moving or stationary mirror 350, is required, and this is shown in FIG. 3. This optical configuration makes it difficult in some applications to scan an array of beams that may be next to each other. It would be desirable to be able to have the scanner in-line with the original beams so that an array of beams that are next to each other could be scanned over a controlled and over a substantial range of positions, by an array of scanners.

Another desirable feature of a scanner is the ability to perform the scan over a substantially large range of positions, in two dimensions with a single mirror device. Typically however, galvanometer based scanners require two scanner mirrors and two galvanometers, for example, one rotation for the vertical axis and one rotation for the horizontal axis. While one mirror may be used in principle to scan in two dimensions, there are problems with the actuation, the scan angle, and the speed of the scan, that limit performance of true two-dimensional single-mirror galvanometer based scanners.

While the MEMS mirrors described above can overcome the compound scan angle difficulty another difficulty is encountered when a substantially large range of positions of a compound rotation angle is induced in a single mirror. That problem is the difficulty of determining the position of the mirror since measurement of one rotation axis by, say, a capacitance sensor or optical sensor, is influenced by the motion in the other rotation axis. So it is desirable to have a way of determining the compound pointing angle direction whereby the two angular sensors are substantially independent of each other.

Another desirable feature of a scanner is having the scanner comprised of a single optical element that may reliably perform functions of both torsion bar and optical element (however again, the MEMS mirrors described can overcome this difficulty, albeit with four torsion bars whereas fewer torsion bars, e.g. one torsion bar, would be desirable).

Another desirable feature of a scanner is the ability to perform the scan over a substantially large range of positions, in two or more dimensions with a single device. Typically however, galvanometer based scanners require two scanner mirrors and two galvanometers, for example, one rotation for the vertical y-axis and one rotation for the horizontal x-axis; and in addition a focussing lens is used for the z-axis. While this configuration may be used in principle to scan in three dimensions, there are problems with the actuation, the scan angle, and the speed of the scan, which limit performance of existing three-dimensional scanners.

SUMMARY OF THE INVENTION

Some method embodiments include steps such as optically coupling at least a first beam and a second beam to an optical conduit; encoding at least information about a set of one or more positions of the optical conduit on at least the second beam; measuring at least the set of one or more positions of the optical conduit from at least the second beam; bending at least the optical conduit, at least partly in response at least to measuring the set of one or more positions of the optical conduit; and modifying at least the first beam exiting a distal end of the optical conduit.

Some apparatus embodiments include an optical conduit, an actuator, a motivator, a patterned optical element, and a servo. The optical conduit can convey at least a first beam. The actuator can be connected to at least the optical conduit. The motivator can at least partly induce motion in at least the actuator, the optical conduit connected to the actuator, and the first beam exiting a distal end of the optical conduit. The patterned optical element can encode at least a set of positions of the optical conduit on at least part of at least the second beam. The servo can drive at least the motivator at least partly in response to at least the encoded positions on the second beam.

Some apparatus embodiments include one or more optical conduits, one or more actuators, one or more motivators, one or more patterned optical elements, and one or more servos. The one or more optical conduits can convey at least a first set of beams. The one or more actuators can be connected to at least the one or more optical conduits. The one or more motivators can at least partly induce motion in at least the one or more actuators, the one or more optical conduits connected to the one or more actuators, and the first set of beams exiting distal ends of the one or more optical conduits. The one or more patterned optical elements can encode at least positions of the one or more optical conduits on at least part of at least the second set of beams. The one or more servos can drive at least the one or more motivators at least partly in response to at least the encoded positions on the second set of beams.

Various embodiments include a telescope, a display, a switch, a microscope, a disc head, memory, and lithographic systems.

Various embodiments can include or exclude parts such as light sources, optical conduits, actuators, motivators, patterned optical elements, servos, beam splitters, optical recording media, photoresist media, optical discs, telescope lenses, telescope mirrors, controllers, screens, and detectors.

DETAILED DESCRIPTION

Some embodiments of an optical scanner based on an optical conduit include an optical fiber. Embodiments of the optical scanner can have resonant motions and/or non-resonant motions. Embodiments of optical fiber scanners with closed-loop servo control modes based on fiber position information feedback from position sensors, are less susceptible to variations in temperature and humidity. These types of operating conditions can affect the resonant condition; thereby altering the scan condition of the uncontrolled resonant scanner in a substantially unpredictable way.

When a resonant fiber scanner is employed in a scanning function comprising for example an x-y raster scan, the fiber scanner naturally tends to scan in only one dimension. Problems arise when a second scan dimension is also required. It may be undesirable to have a raster x-y scan comprised of two resonant actuations of the fiber. In some preferred embodiments of a raster x-y scan, with the y-axis resonant or near resonant, the x-axis actuation may be either at a constant velocity or at an acceleration and de-acceleration to each of the desired x-axis scan locations. While the resonant or near resonant fiber is moving in the y-axis, problems can arise when motion is induced in the x-axis. For example, when the fiber is moved to the new x-axis the fiber tends to resonate along the x-axis even when this resonant motion is undesirable.

In either resonant or non-resonant embodiments the scanner can operate in a closed-loop servo mode based on fiber position information feedback from sensors. More advanced resonant and non-resonant fiber scanner embodiments utilizing servo control, based on sensing of the fiber position, can operate in more complicated scan patterns. Some embodiments can operate in two and three dimensional scan patterns where the fiber is bent in a manner different from the bending that results from just vibrating the fiber.

Figure 1:
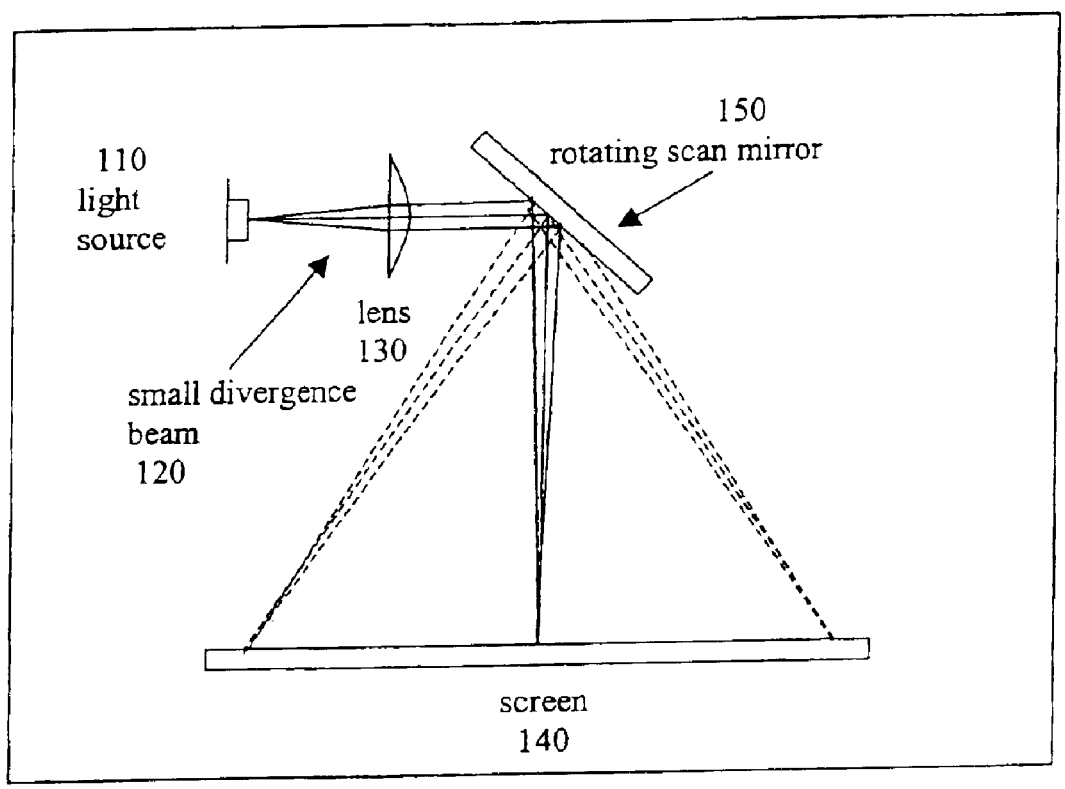
FIG. 1 shows a scanner with a small divergence beam.
Figure 2:
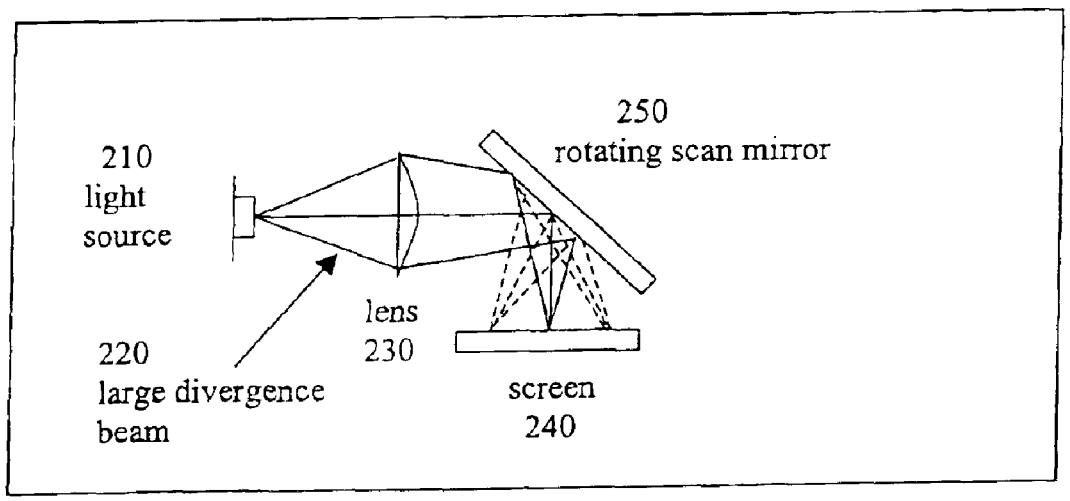
FIG. 2 shows a scanner with a large divergence beam.
Figure 3:
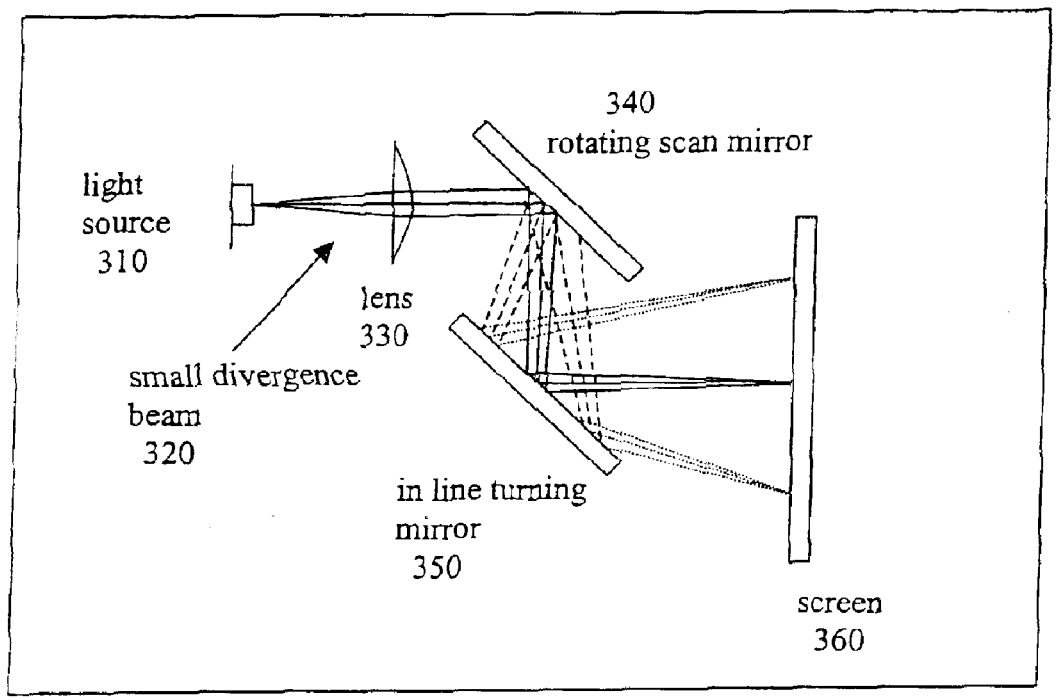
FIG. 3 shows an in-line scanner.
Figure 4:
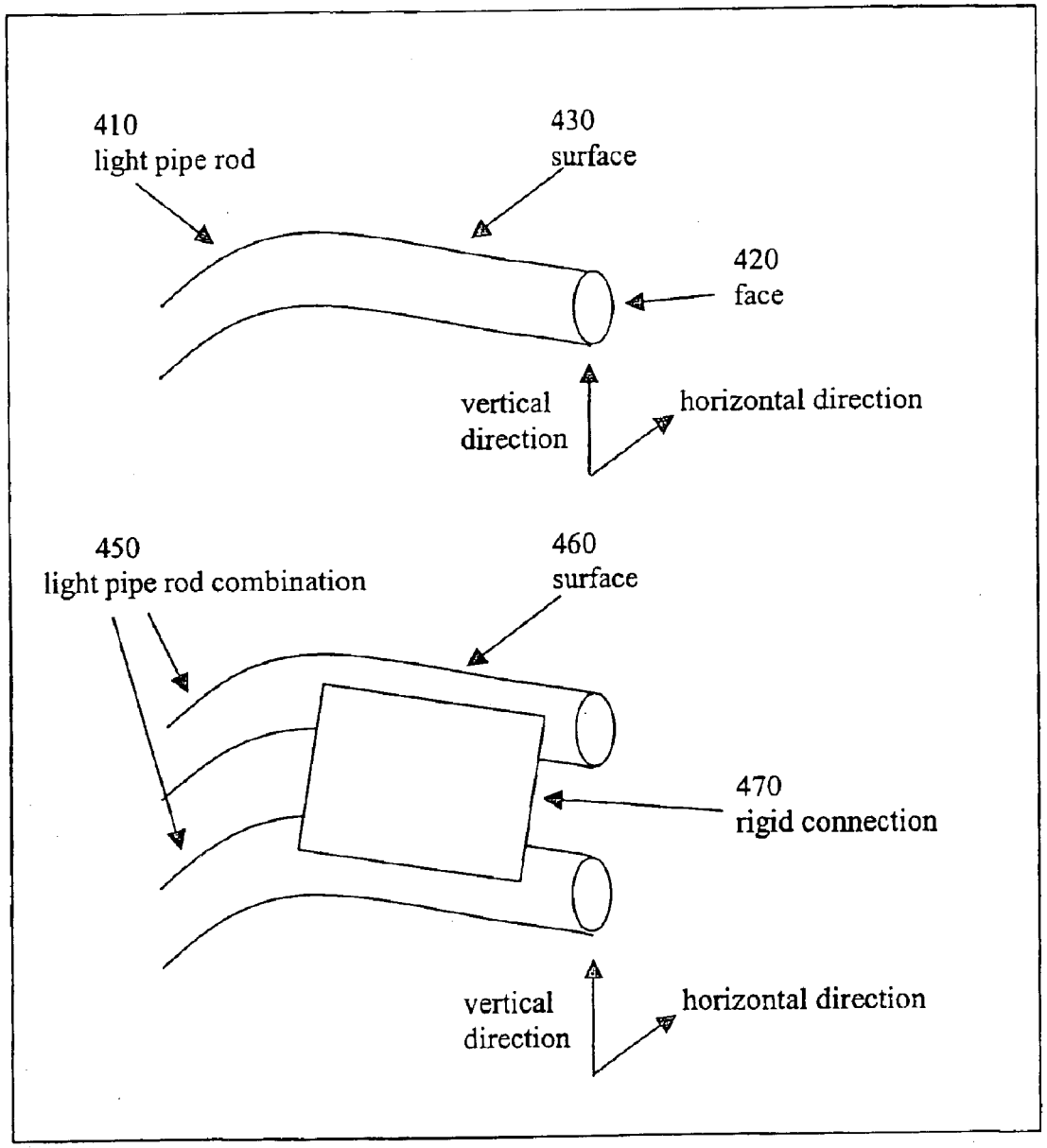
FIG. 4 shows optical conduits with mass and stiffness properties.

In some embodiments of an optical conduit based scanner operating either near the resonant condition or operating in the off resonant condition; the resonant condition can be chosen by design. The resonant condition is essentially determined by the mass and the stiffness of the optical conduit, which may be a light pipe rod 410, and is shown in FIG. 4. For example, a long light pipe rod 410, may not be very stiff so that the resonant condition may be at a lower frequency than desired. Some embodiments can modify the properties of the optical conduit so that there is more choice in the design of the resonant condition. For example in FIG. 4, two optical conduits comprising light pipe rods 450, are attached together along a portion of their surface 460, by a rigid connection 470, thereby modifying their original stiffness and mass properties. The resonant condition of the light pipe rods 450, is now different in say the horizontal direction from the vertical direction. The resonant condition of the attached light pipe rods 450, is also different from the resonant condition of the single light pipe rod 410. This embodiment of the optical conduit is beneficial in the operation of a scanner operating in a two or more dimensional scan pattern; for example, in a raster scan with a focus control.

While fiber scanners are attractive for scanning certain beams with properties that allow the beam to be effectively coupled into the fiber; there are beams that do not couple well into fibers. Some embodiments have an optical conduit with properties more like a light pipe than a fiber optic that would more effectively receive and convey the light.

Some embodiments can perform in-line scanning of large divergence beams in two dimensions with a single, reliable, light-weight, optical element referred to as an optical conduit, serving as both the compound angle torsion bar and the optical element. In addition, the sensors that measure the one or more positions of the optical conduit, thereby determining the positions of the optical conduit, may be independent of each other which simplifies the servo controlled operation of the scanner.

A large divergence beam may come from arc lamps, or filament lamps, or light emitting diodes called LEDs, or conventional cavity lasers or laser diodes, or vertical cavity lasers called VCSELs, or other optical sources where the beam may not be well collimated. This beam may be focussed into the proximal end of an optical conduit. The proximal end of the optical conduit can have an acceptance angle exceeding or equal to the divergence of the beam for best efficiency. Also, the spot size of the beam at the proximal end of the optical conduit entrance face can be equal to or smaller than the proximal end of the optical conduit face for best efficiency. Some embodiments of optical conduits contain optical fibers or light pipes or combinations of both.

Figure 5:
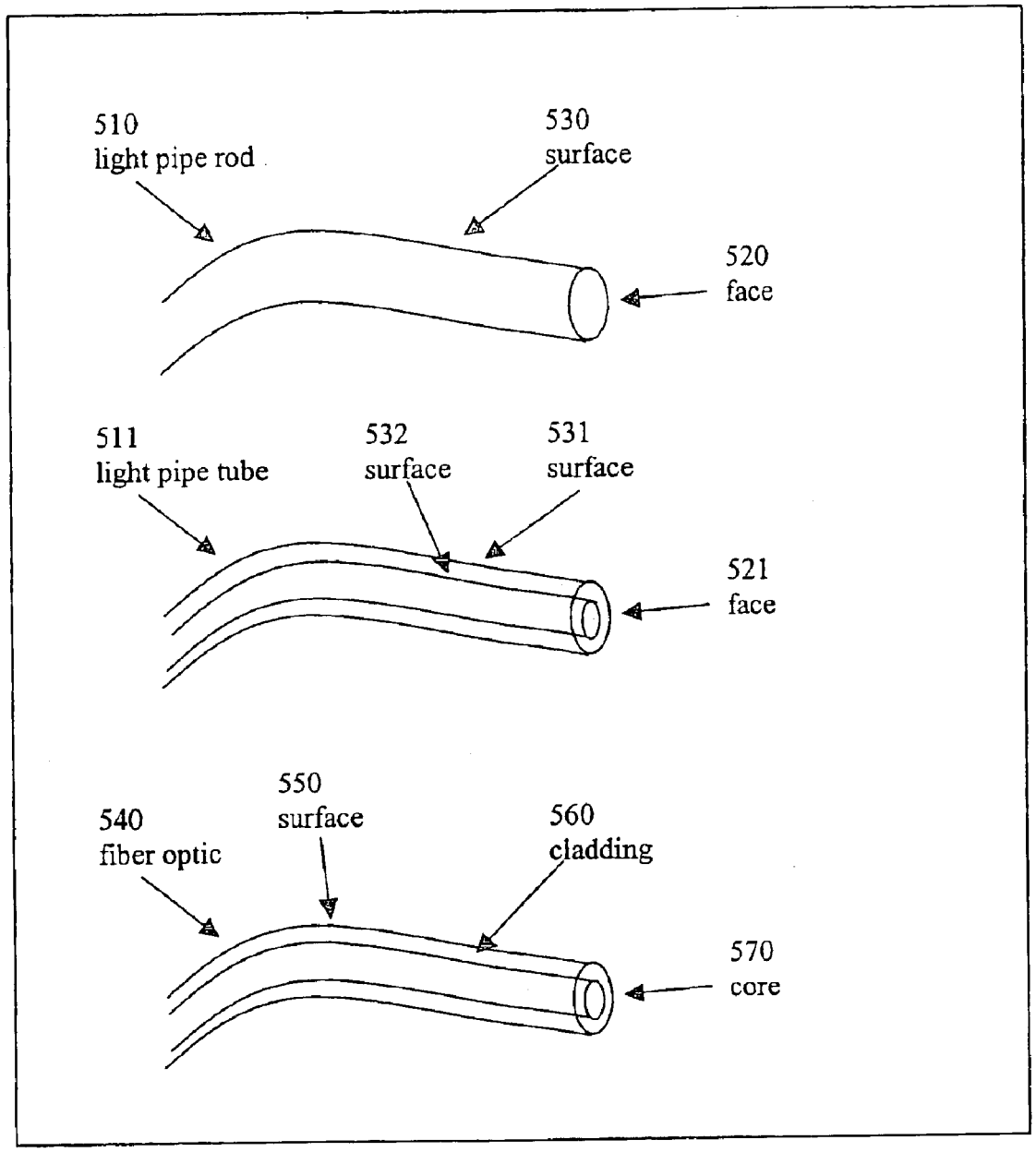
FIG. 5 shows optical conduits.

Typical optical conduits are shown in FIG. 5. A light pipe, may be fabricated out of a rod, 510, or tube, 511, of fused silica, or glass or plastic. The cross section of the rod, 510, or tube 511, may be circular, square, rectangular, annular, or oval. The cross section of the rod, 510, or tube 511, may also substantially be circular, square, rectangular, annular, or oval; for example, the square may have rounded corners, a circle may not be perfectly round, a rectangle may be slightly curved, etc. In some cases a reflective coating applied to the outside cylindrical surface of the rod, 530, or may be applied to the inside cylindrical surface, 532, or outside cylindrical surface, 531, of the tube, 511, which serves to trap and thereby conduct the light inside the light pipe. Also an optical conduit may be fabricated out of a length of optical fiber, 540, comprising a core material, 570, surrounded by a cladding material, 560. And in addition an optical conduit may be comprised of a combination of light pipes and fiber optics. A notable example of this is a fiber optic where light is conventionally conveyed by the core, 570, however if a reflective coating is applied to the cylindrical surface, 550, of the outside of the cladding, 560, then light may also be conveyed by the cladding. Recently hollow core airguiding fibers with bandgaps have become commercially available and would also serve as optical conduits for optical scanners.

Figure 6:
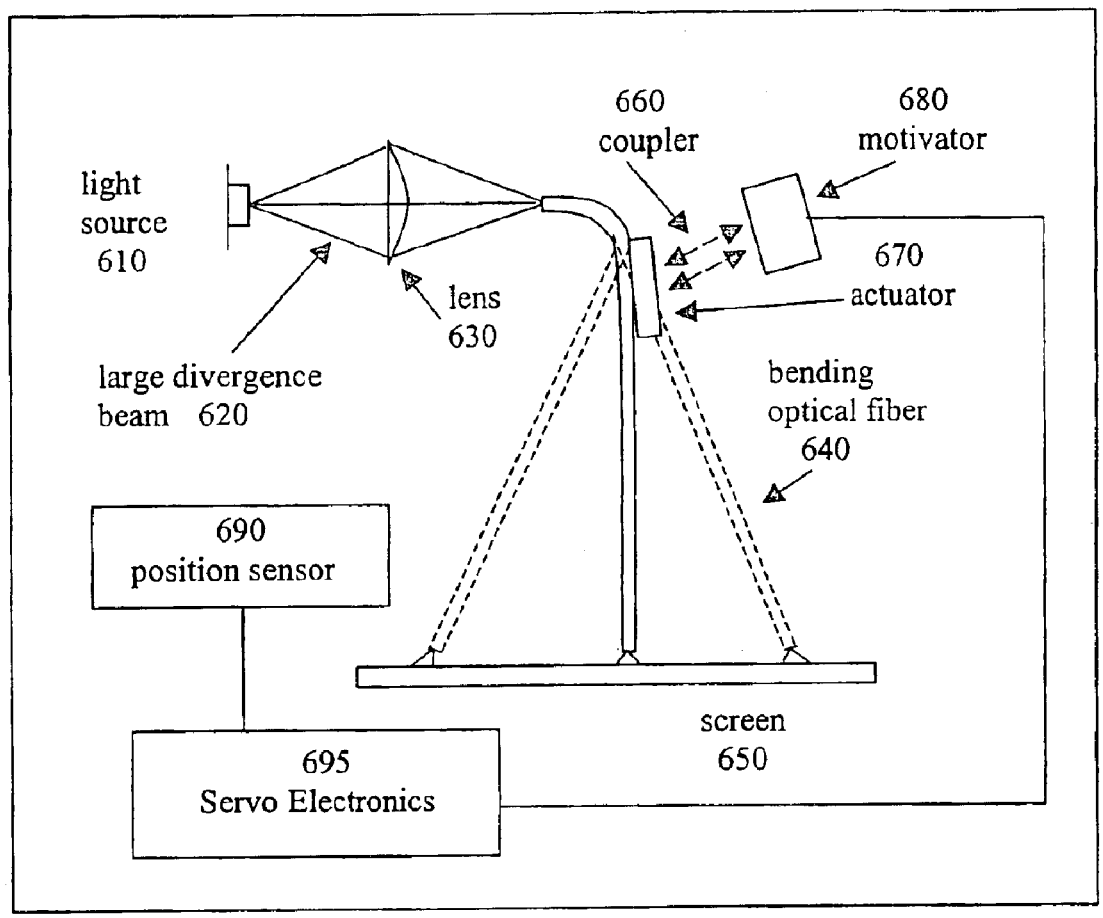
FIG. 6 shows a fiber scanner.

FIG. 6 shows an optical scanner that uses an optical conduit consisting of a light-weight, flexible, optical fiber 640, fabricated out of fused silica for the core with either plastic or silica cladding, in an embodiment, and the optical fiber is readily scanned in two or more directions. The fiber may be bent about single or multiple portions by an actuator 670, attached to the fiber 640. There may also be multiple actuators bending the fiber about single or multiple portions.

The actuator 670, may bend the fiber in response to a motivator 680, coupled to the actuator by a coupler 660. In an embodiment the motivator 680, is a piezo electric ceramic and the coupler 660, is a physical attachment to the actuator 670. In another embodiment the motivator 680, is a servo controlled galvanometer motor and the coupler 660, is a physical attachment of the galvanometer shaft to the actuator 670. In another embodiment the motivator 680, is a field generator generating a magnetic field, the coupler 660, is the magnetic field, and the actuator 670, is a permanent magnet. In another embodiment the motivator 680, is a field generator generating an electric field, the coupler 660, is the electric field, and the actuator 670, is a metallic coating on the fiber. In embodiments requiring one, two, or three dimensional scan motion, any number of combinations of the above sets comprising motivator, coupler, and actuator, can serve to bend the optical fiber at one or more positions along the optical fiber.

Bending the fiber can cause motion in the fiber. A set of positions of the fiber 640, is measured by the position sensor 690, and the servo 695, is used to control the motion of the fiber at least partially in response to the set of positions measured by the position sensor 690. Since the fiber is light-weight, as compared with a typical scanning mirror, the motion may be fast and may require small actuator forces. Since the fiber effectively carries the light with it. the light also moves in a scan pattern determined by the fiber motion at the exit face.

Measurement of the positions of the fiber with the position sensor allows the scanner to compensate for changes in temperature, humidity, age of one or more parts of the scanner, faults occurring in the scanner, physical disturbances of the scanner, etc. Thus, measurement of one or more positions of the fiber with the position sensor allowing closed-loop servo control of the scan, makes the scanner reliable. These measurements with the position sensor can provide data unavailable from, for example, the motivator.

Figure 7:
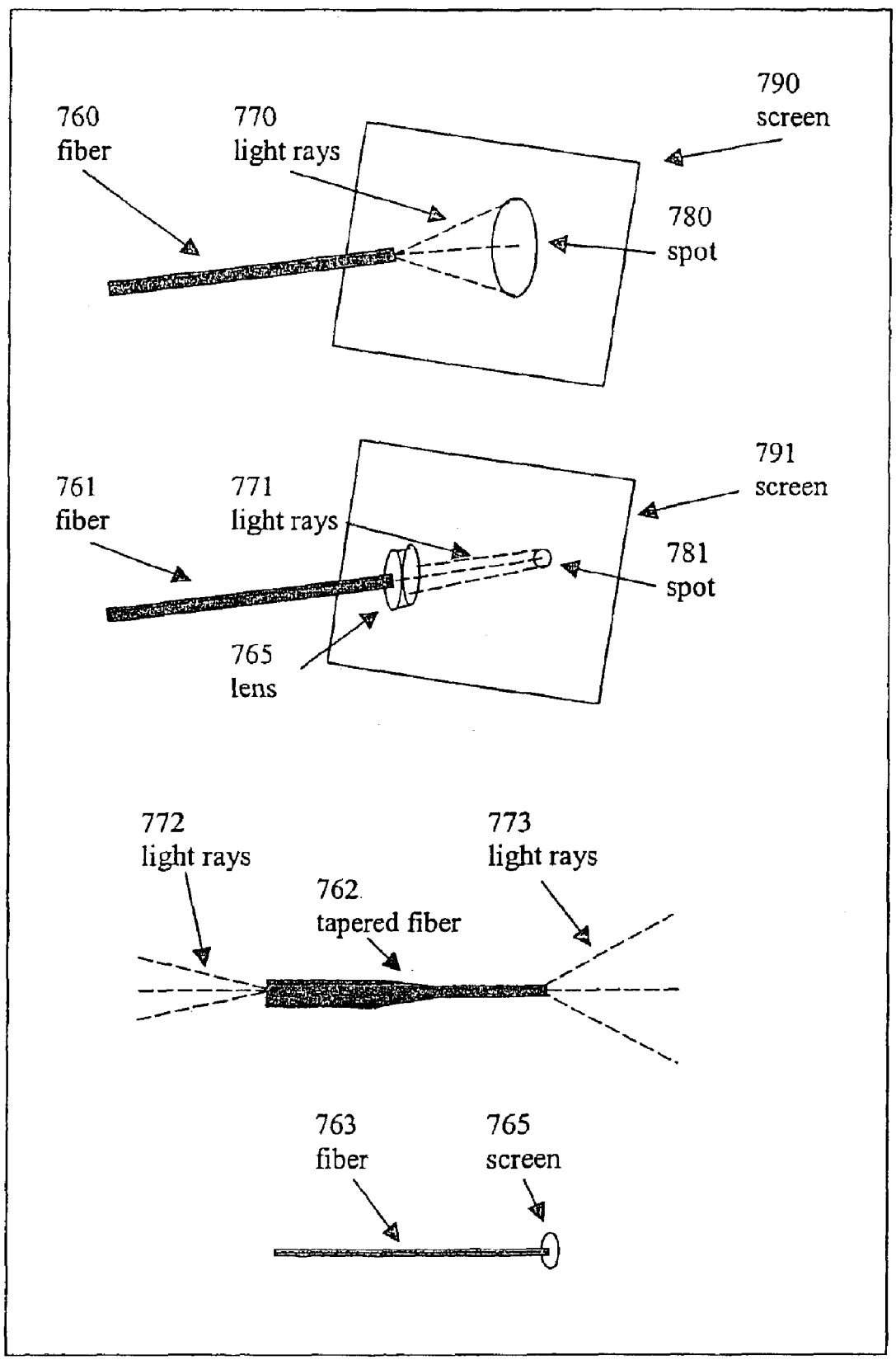
FIG. 7 shows properties of light exiting the fiber.

Light rays 770, exiting the moving fiber 760, may produce a set of spots 780, on a diffusive or phosphor screen 790, corresponding to each position of the fiber 760, relative to the screen 790, and thereby produce a picture on the screen 790, as shown in FIG. 7. In another embodiment a lens 765, may be attached to or formed from the end of the fiber 761 to focus the light at each spot 781, on the screen 791. In addition a tapered fiber 762, may have a proximal end which accepts light rays 772, that is different from the distal end that accepts light rays 773. In another embodiment the distal end of the fiber 763, may serve as the screen 765, having the properties of a diffuser or of a phosphor.

Figure 8:
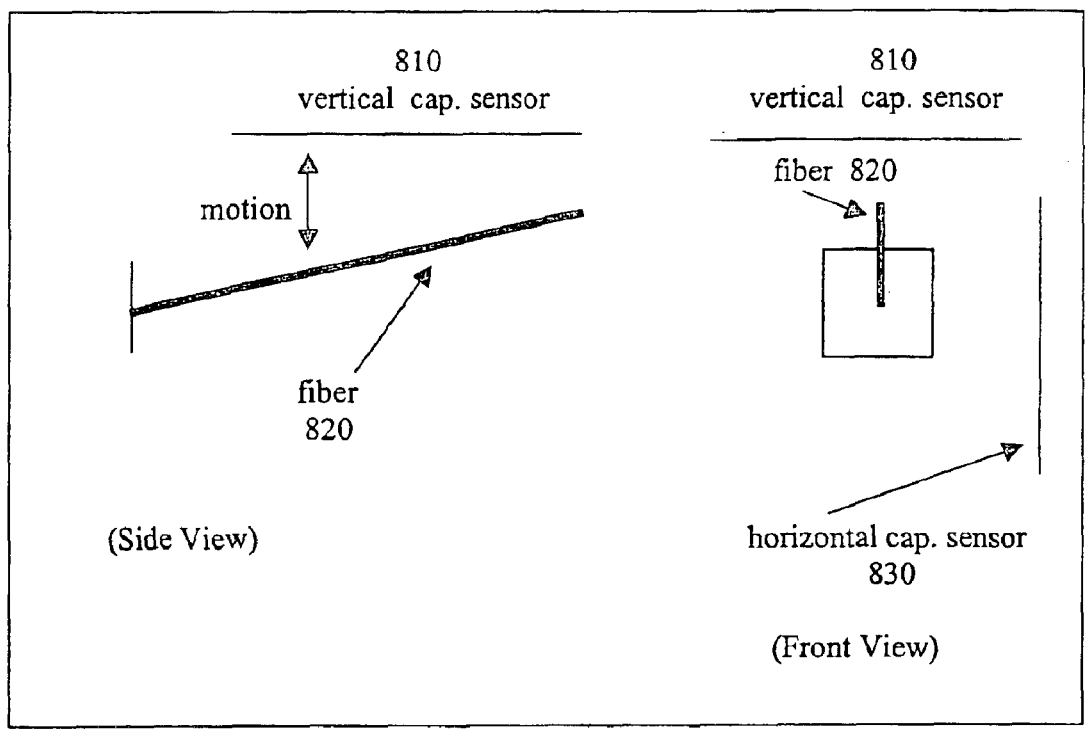
FIG. 8 shows a compound angle fiber capacitance sensor.

FIG. 8 shows how a capacitance sensor measures two independent positions of a fiber 820, say the horizontal position from the horizontal capacitance sensor plate 830, and the vertical position from the vertical capacitance sensor plate 810, of the fiber 820. In an embodiment the two capacitance measurements can be essentially independent of each other. Because the fiber is substantially a line, a properly designed sensor determines the position of that line in only one direction and is not influenced by motion in the other direction. The capacitance for a 50 millimeter long fiber with a 0.2 millimeter diameter spaced about 5 millimeters from the horizontal plate can be several hundredths of a picofarad. During a vertical motion of the fiber 820, the capacitance changes relative to the vertical plate 810, producing a signal that can be used to determine the vertical position of the fiber 820. The capacitance relative to the horizontal plate 830, changes very little during this vertical motion. Similarly, horizontal motion of the fiber 820, can be measured as a change of capacitance relative to the horizontal plate 830.

Figure 9:
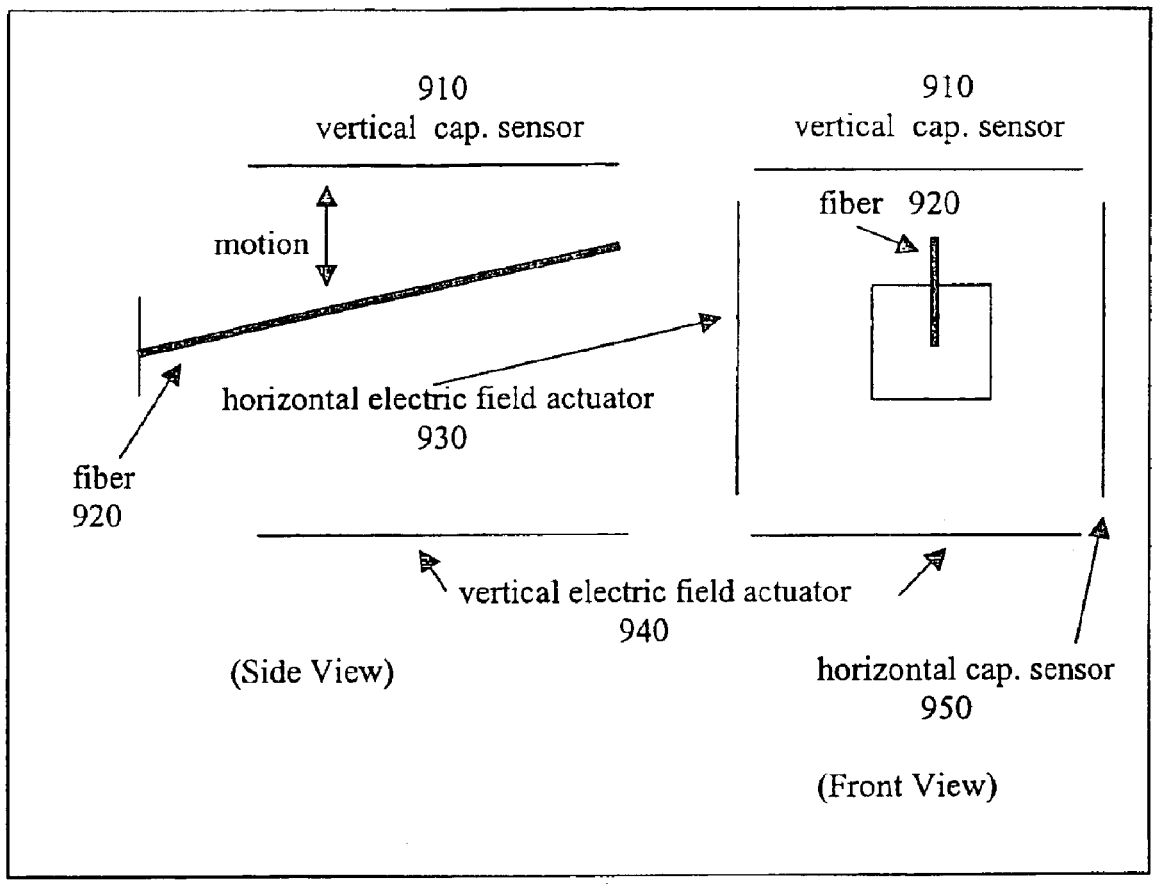
FIG. 9 shows a compound angle fiber electric field actuator.

An embodiment of a compound angle optical scanner based on a flexible light pipe fiber 920, and electric field actuators 930 and 940, is shown in FIG. 9. The capacitance sensors 950, and 910, are used to determine the position of the fiber. In operation the actuators move the fiber to a commanded position and the sensors measure the actual position with a servo controlling the operation to make the commanded and actual positions as close as allowed.

Figure 10:
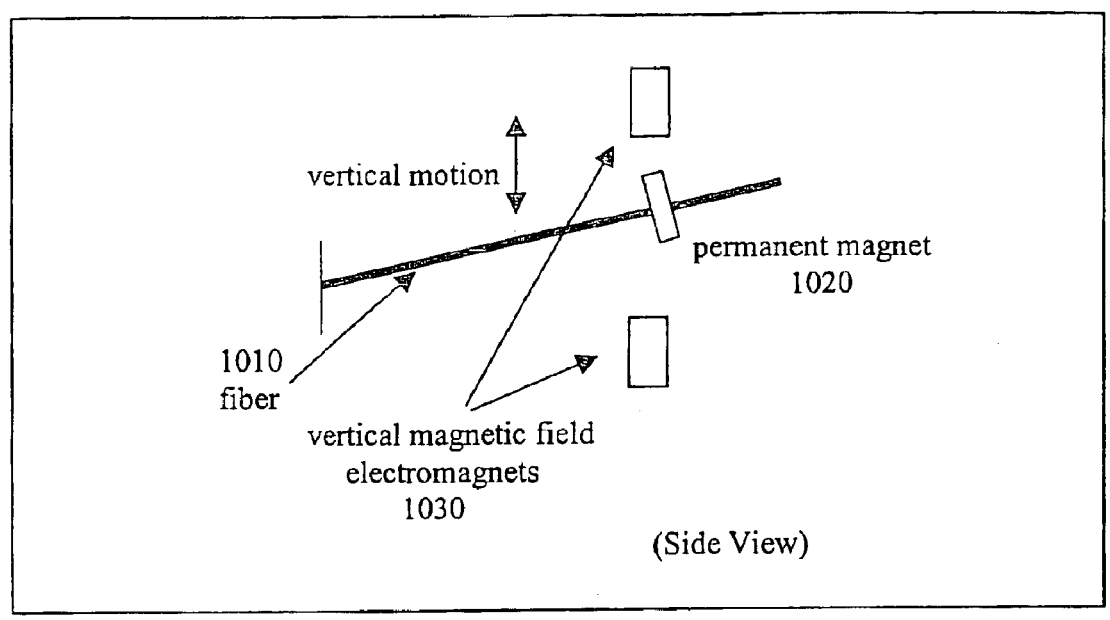
FIG. 10 shows a compound angle fiber magnetic field actuator.

Another embodiment of a compound angle motivator, coupler, and actuator is based on a light pipe fiber 1010, and magnetic field actuators based on electromagnets 1030, and a permanent magnet 1020, attached to the fiber 1010, for vertical motion, is shown in FIG. 10. Not shown in the FIG. 10 is another set of electromagnets and permanent magnet attached to the fiber to actuate motion in the horizontal direction.

Figure 11:
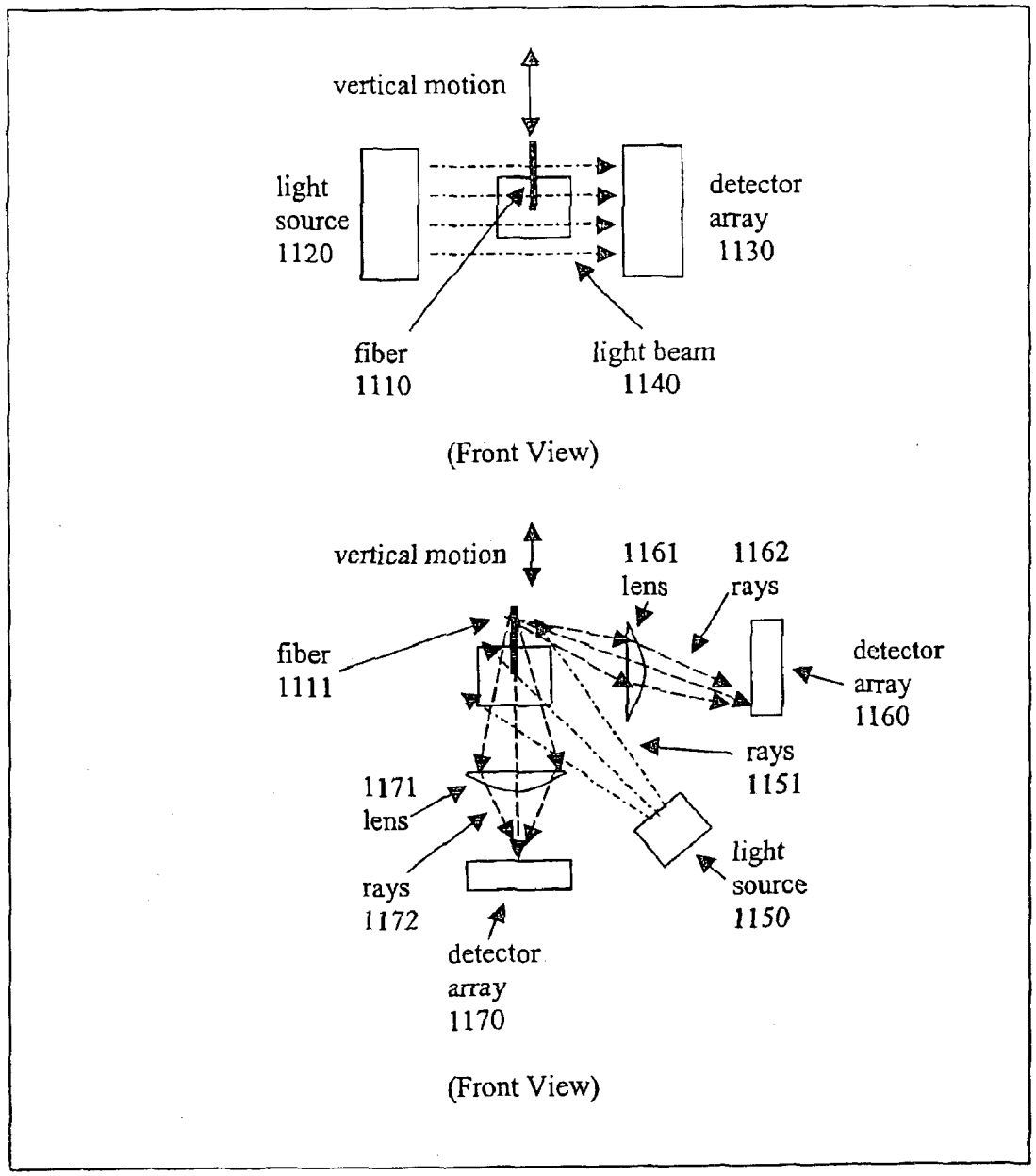
FIG. 11 shows a compound angle optical sensors.

In another embodiment two optical signals can be used to determine the positions of an optical conduit. As shown in FIG. 11, light source 1120, illuminates the fiber 1110, and casts a shadow of the light pipe fiber 1110, on the detector array 1130, that may be a photodiode array, and the position of the shadow in the light beam 1140, can be used to determine the position of the light pipe fiber 1110. A second light source similar to 1120, and position sensor similar to 1130, are used to determine the horizontal component of the motion of fiber 1110.

In another embodiment shown in FIG. 11, the fiber 1111, is illuminated by a light source 1150 generating light rays 1151. Light rays 1162 reflected from fiber 1111 collected by lens 1161 and received by a detector array 1160 provide the position information for the vertical component of the scan. In addition, rays 1172 reflected from the fiber 1111, collected by lens 1171, and received by a detector array 1170, provide the position information for the horizontal component of the scan.

Figure 12:
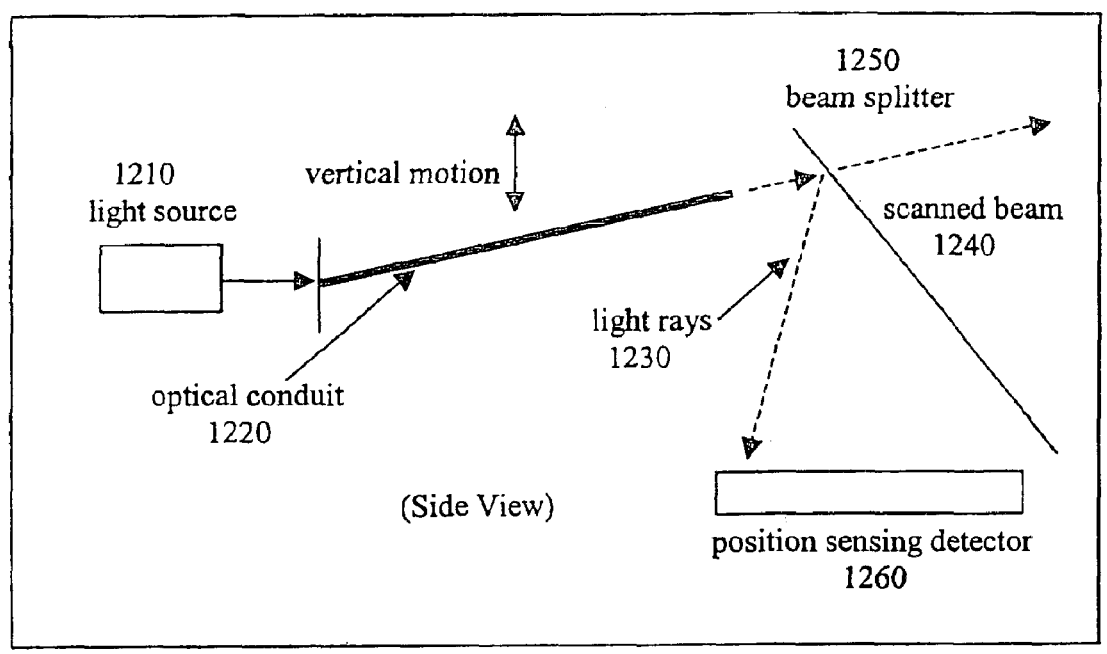
FIG. 12 shows a compound angle optical sensor.

Another embodiment of the optical sensor for the optical conduit is shown in FIG. 12 where the optical conduit 1220, itself serves to convey the optical signal from light source 1210, that is reflected off a beam splitter 1250, and back to a detector 1260. The single position sensing detector 1260 can determine both components of the compound angle.

Figure 13:
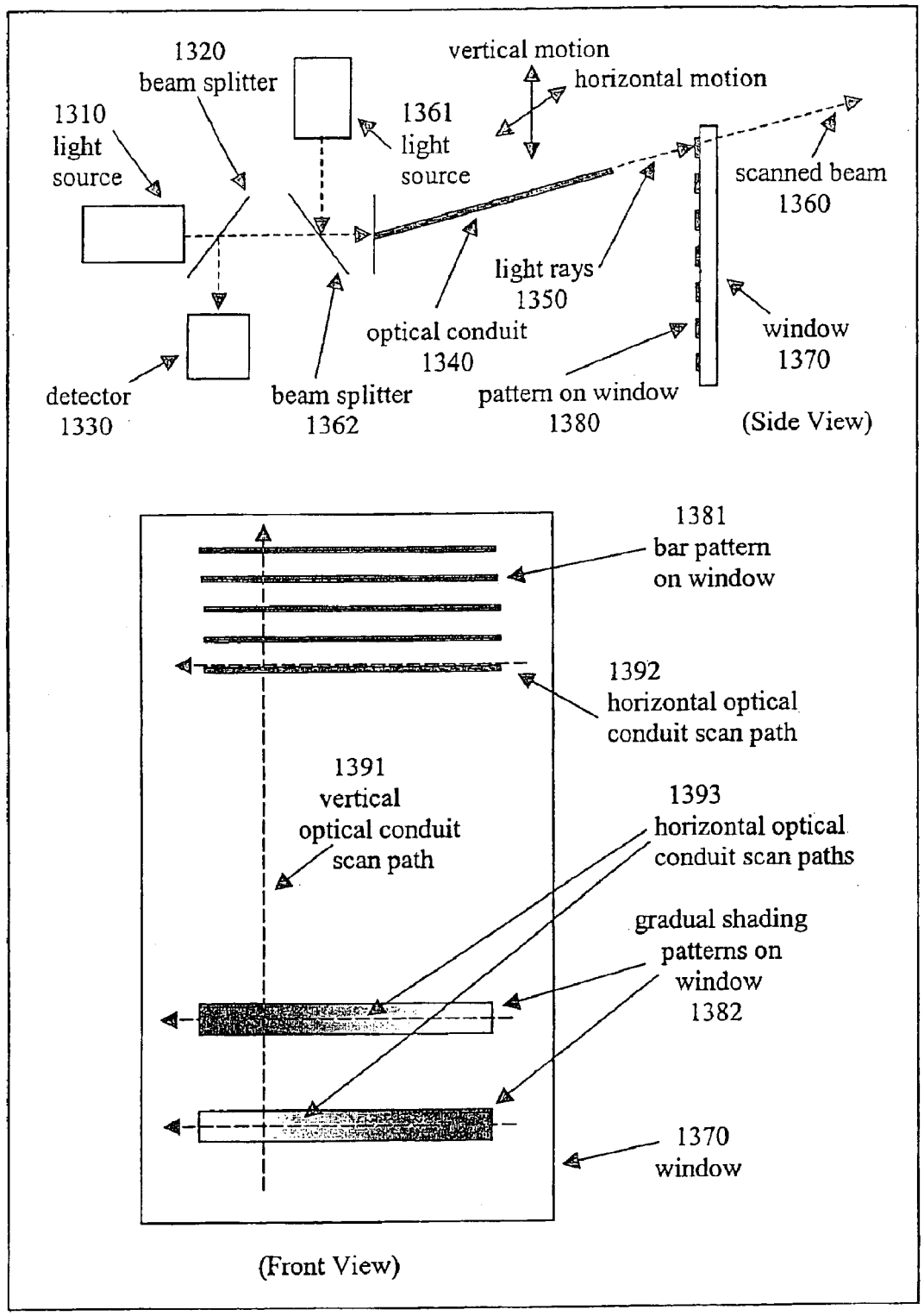
FIG. 13 shows a compound angle optical sensor using a pattern on the window.

In yet another embodiment of the optical sensor shown in FIG. 13, the optical conduit 1340 transmits a beam of light rays 1350 from light source 1310 onto a window 1370, and a coating providing a pattern on the window 1380. The pattern is encoded in the rays 1350, which are partially reflected back into the optical conduit 1340, and reach the detector after a partial reflection from the beam splitter 1320. The electrical signal from the detector 1330, thereby results from the pattern on the window 1380, and determines the position of the optical conduit 1330 relative to the window 1370. A scanned beam light source 1361, is coupled into the optical conduit 1340, by beam splitter 1362, and generates a scanned beam 1360. In an embodiment the pattern on the window 1380, may be substantially reflective at one set of wavelengths centered in the infrared for example at 880 nanometers with light source 1310, emitting at those wavelengths and detector 1330, receptive to those wavelengths. In addition the pattern of the window may be substantially transmissive at another set of wavelengths for example those in the visible wavelengths with scanned beam light source 1361, and scanned beam 1360, substantially comprised of the visible wavelengths.

Several examples of patterned windows are also shown in FIG. 13. In an embodiment of a bar pattern on the window 1381, the vertical optical conduit scan path 1391, traverses the bar pattern 1381 and encodes the pattern on the rays 1350, which are received by the detector 1330. The encoded pattern is converted into a voltage signal by the detector 1330, which can be used by a controller to provide information on the position of the optical conduit 1340, relative to the bar pattern 1381, on the window 1370. By counting the number of bars for example the vertical position of the optical conduit can be determined. Additional information such as the frequency of the vertical optical conduit scan can be determined by the controller for example by counting how fast the bar pattern changes in time. The bar pattern 1381, may also be used to control the vertical position of the horizontal optical conduit scan path 1392. Assuming the optical conduit is centered on the edge of the bar of pattern 1381, then a fraction of the signal that would result from the optical conduit being centered on the bar pattern 1381 is detected by detector 1330. During the horizontal optical conduit scan, if the fraction of the signal increases then the optical conduit has drifted down, similarly if the fraction of the signal decreases then the optical conduit has drifted upwards. The controller can use this position information to provide appropriate drive commands to the motivator to keep the optical conduit on track during the scan.

FIG. 13 also shows gradual shading patterns on the window 1382, that may be used to control the horizontal position of the optical conduit during a scan. The vertical optical conduit scan path crosses the two gradual shading patterns 1382, and thereby produces two signals at detector 1330. In one embodiment the ratio of the two signals corresponds to the horizontal position of the vertical optical conduit scan path 1391. The horizontal position of the horizontal optical conduit scan paths 1993, can be determined by a controller from the fraction of the signal reaching detector 1330, which is encoded on the rays 1350, by the gradual shading patterns 1382.

Figure 14:
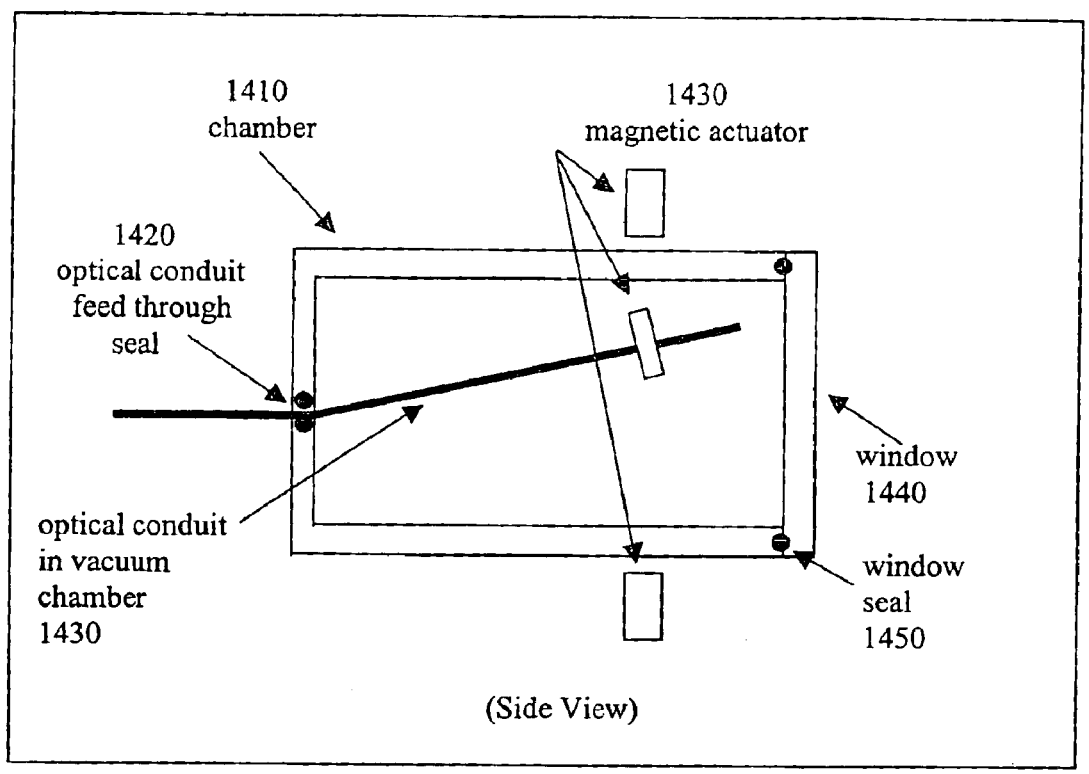
FIG. 14 shows a light pipe scanner in a vacuum chamber.

A scanning optical conduit can be operated in a vacuum. The feed through into the vacuum chamber 1410 can include the optical conduit 1430, as shown in the embodiment in FIG. 14. The actuators 1430, may be magnetic, as shown, or electric. A portion of the chamber wall 1410, can allow the magnetic and/or electric field to pass through. The optical conduit 1430, and the window 1440, are sealed to the chamber 1410, with typical sealing materials 1420, for the optical conduit feed through, and 1450 for the window seal. The seals such as O-rings or hermetic seals such as low out gassing cements are typically used.

Figure 15:
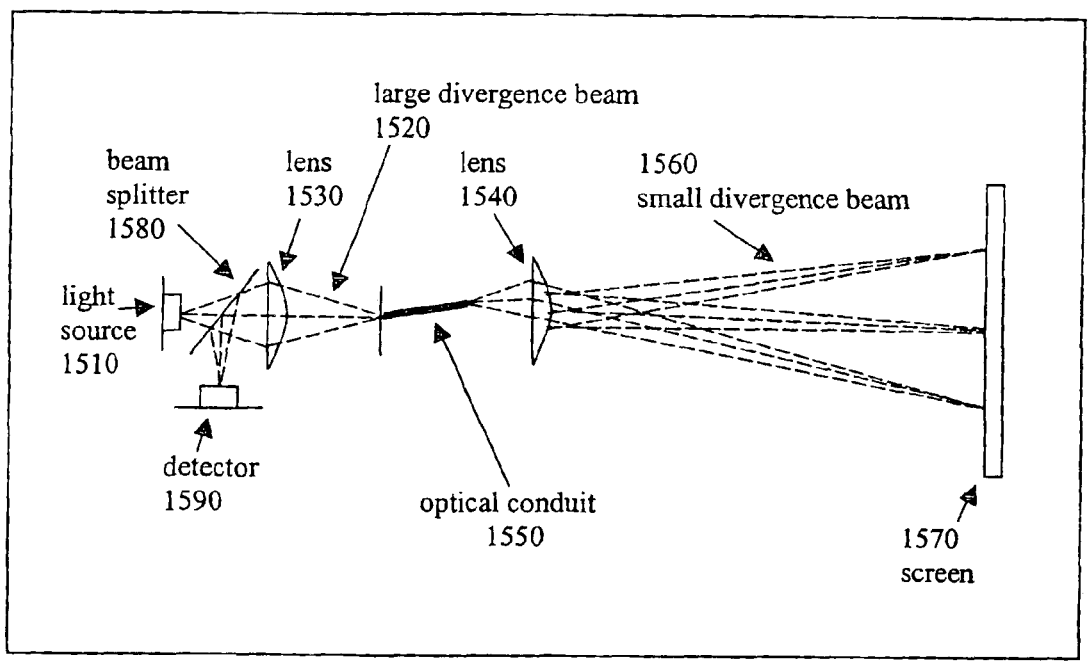
FIG. 15 shows a light pipe scanner for a telescope.

FIG. 15 shows a telescope embodiment with a scanner. A telescope usually works with light of low divergence of the transmitted light 1560, sent to and/or received from a target or screen 1570. Light rays to the left of lens 1540, are larger divergence as shown by the large divergence beam 1520. The lens 1530, serves to match the beam divergence of rays coming from source 1510, to the rays of large divergence suitable for coupling into the optical conduit 1550. The lens 1540, referred to as a telescope lens may be a refracting telescope design comprised of either a Newtonian lens pair or a Galilean lens pair used in an embodiment to image the output face of the fiber 1550 onto the screen 1570.

In FIG. 15 the light source 1510, serves to illuminate the screen and is referred to as a transmitter. The detector 1590, serves to collect rays from the target or screen 1570, in the apparatus referred to as an astronomical or terrestrial telescope that produces a magnified image of the target or screen.

Figure 16:
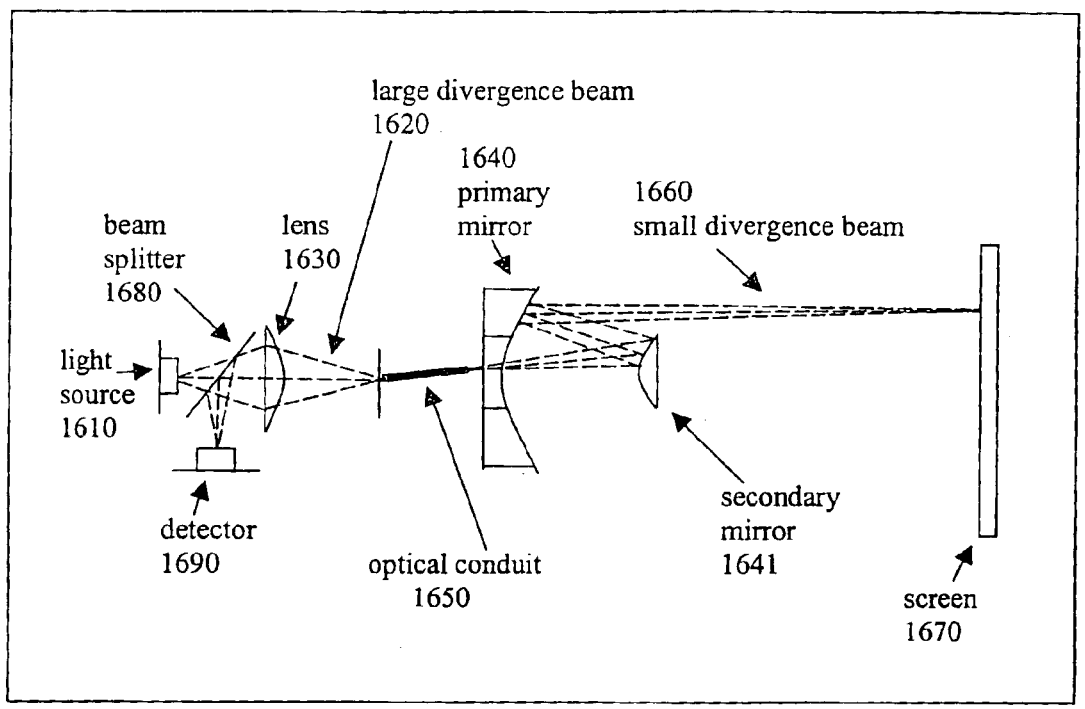
FIG. 16 shows a light pipe scanner for a Cassegrain telescope.

The embodiment for a reflecting telescope is shown in FIG. 16. Mirrors 1640 and 1641, also referred to as telescope mirrors, may be designed with either a Cassegrain mirror pair or a Newtonian mirror pair, used in an embodiment to image the output face of the optical conduit 1650, onto the screen 1670. In the Cassegrain design shown the primary mirror 1640, has a hole in it. Additional telescope designs are presented in "Principles of Optics", Born and Wolf, fifth edition 1975.

Figure 17:
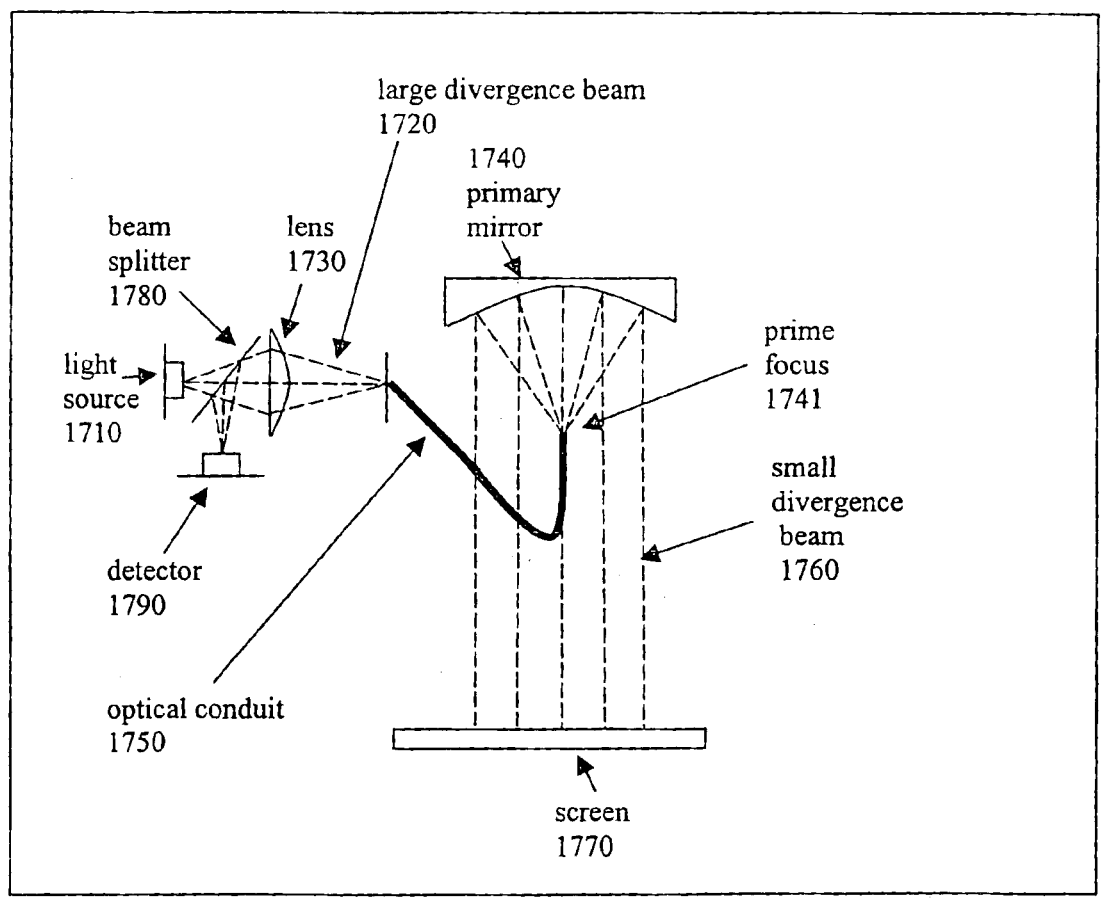
FIG. 17 shows a light pipe scanner for a scanning light pipe telescope.

In the mirror pair arrangement, either Cassegrain or Newtonian, one of the mirrors, the secondary mirror, is in the way of the other primary mirror and light must pass around this secondary mirror. Also in some embodiments the primary mirror must have a hole in it for light to pass to the detector. In the embodiment shown in FIG. 17 the fiber scanner, with the optical conduit 1750, in the way of the light that reaches the primary mirror 1740, and optical conduit 1750, serves to collect light from the prime focus 1741. Because optical conduit 1750, is much smaller than the primary mirror 1740, only a small portion of the rays in the small divergence beam 1760, are blocked. In this telescope design only one mirror, the primary 1740, is required.

The general embodiments for two classes of scanner operation are described below. The first class is a raster scanner that typically is used for efficiently covering as large an area as possible in a given period of time. For example a raster scanner is typically used in the display of a picture using row and column control of the location of two dimensional picture elements. There are many other applications of raster scanners. The second class is a vector scanner that typically optimizes the time to scan between two desired locations. For example a vector scanner is typically used in the design of an optical cross-port switch. There are many other applications of vector scanners. The third class is a combination of vector and raster scanner where both features of raster and vector scan are employed. For example tracking and acquisition scanners are used in astronomical and terrestrial pointing of sensors such as telescopes, microscopes, optical disc players and recorders, optical lithography systems, range finders, optical radars, remote pollution monitoring systems, and LIDAR (Light Detection And Ranging) systems; such tracking can be based on a known pattern. There are many other applications of this class of scanners.

Raster Scanner Embodiments:

In a raster scanner the locations of a large number of positions in a connected area are known. This makes it possible to move efficiently to these positions in either a natural linear motion, or a natural angular motion, or a natural sinusoidal motion. A natural motion can be one requiring very little force. For example in a natural linear motion the movement is at a constant velocity, and the force required to maintain the motion depends on friction or damping. Also for example in a natural angular motion the movement is at a constant angular velocity, and the force required to maintain the motion depends on action or damping. Also for example in a sinusoidal motion the movement is at a constant resonance frequency, and the force required to maintain the motion depends on friction or damping.

Figure 18:
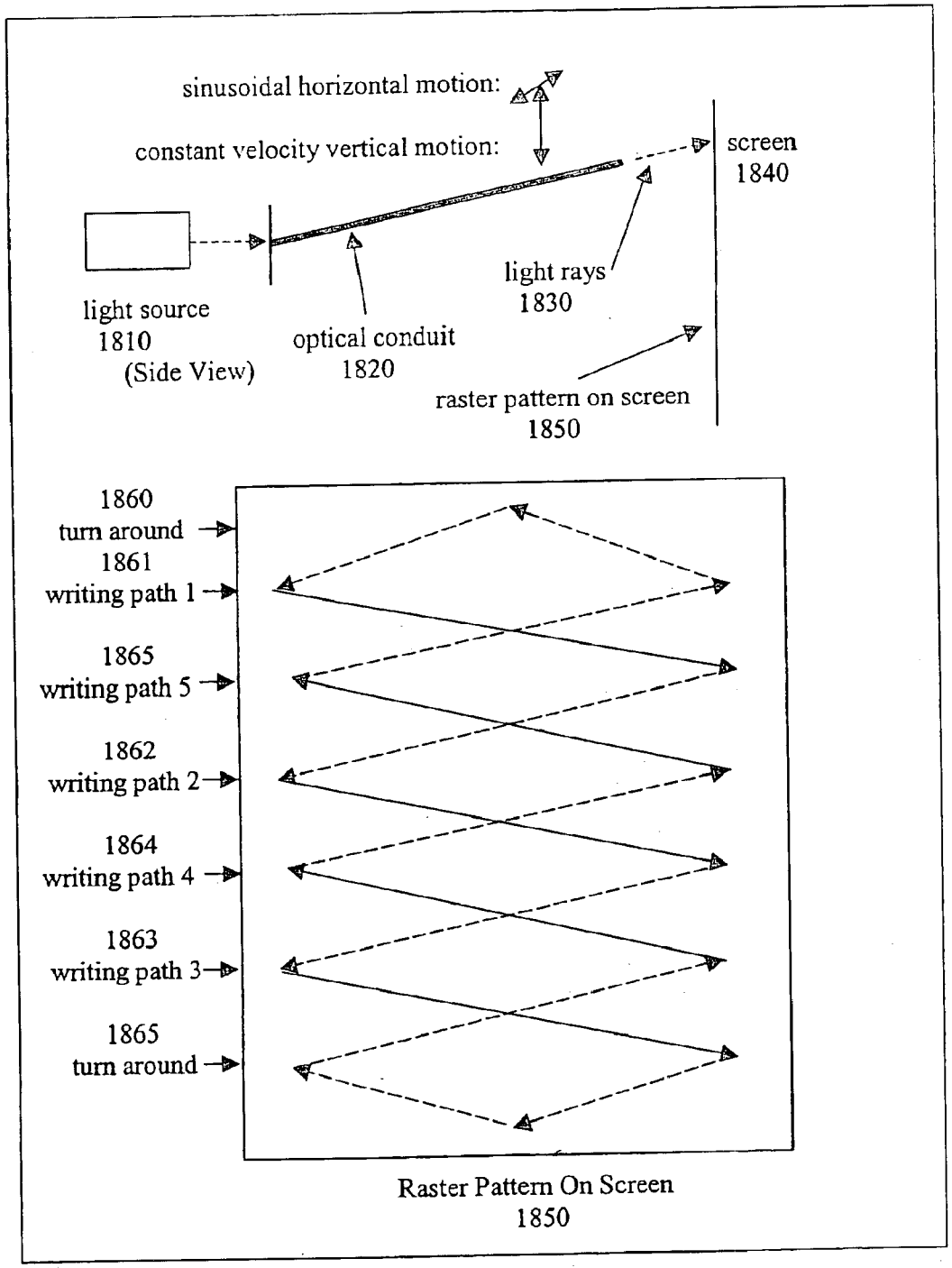
FIG. 18 shows a raster scan pattern for a display.

FIG. 18 shows an embodiment of a display using an optical scanner based on an optical conduit 1820, moving in a raster scan with a sinusoidal motion imposed on one axis and a constant velocity imposed on the other axis. The light source 1810, is coupled into the optical conduit 1820, and rays leaving the optical conduit 1830, form a spot on the screen 1840. The light source is modulated in intensity and may write a picture on the screen by correlating the intensity of the light with the position on the screen 1850. A controller is used to synchronize the position of the raster scanner at the screen with the modulation of the intensity of the source 1810, thereby creating a picture on the screen 1850.

If there were no friction or damping the only force required to maintain the motion would be the force required to change the direction of the constant velocity axis. In one complete cycle of the raster scan the solid lines represent writing locations for writing paths 1, 2, and 3, with identifiers 1861, 1862, and 1863, and the dashed lines indicate non-writing scans for retrace. The beam then turns around identifier 1865, and writing paths 4 and 5 with identifiers 1864 and 1865, are shown with their dashed nonwriting retrace paths. The final turn around 1860, non-writing path completes the raster cycle. The skew angle made by the writing scans is caused by the velocity of the fiber in the vertical direction during the writing scans. This skew angle can be very small and may not be noticeable. Also as shown in FIG. 18 the skew angle can be made the same for velocity in either the up or down vertical directions. In addition the number of scans may be larger or smaller than shown and the density of the scans can be varied from scans being close together or far apart.

Figure 19:
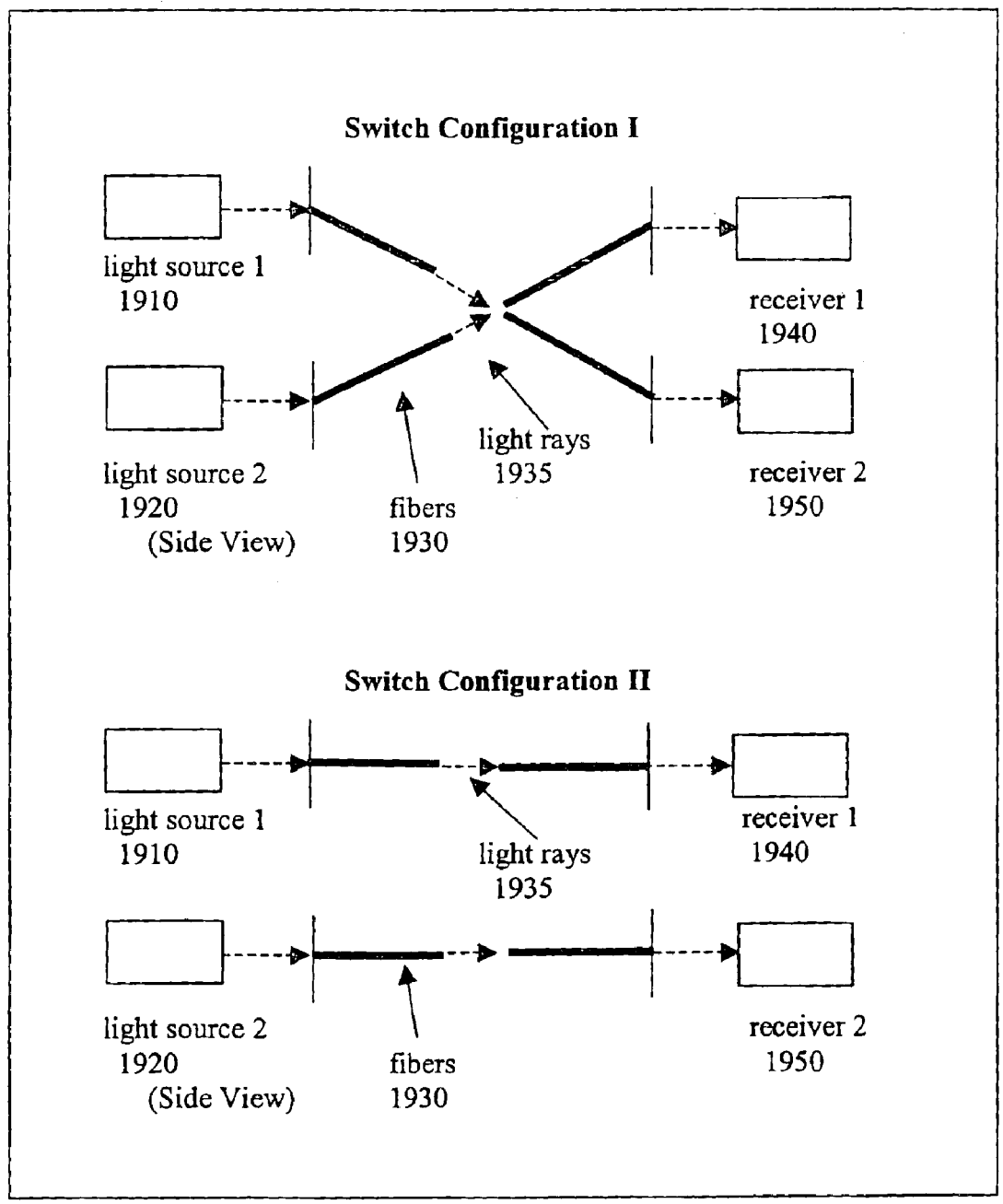
FIG. 19 shows a vector scan pattern for an optical cross-port switch.

Vector Scanner Embodiments:

An example of the vector scan embodiment is given for a fiber optic cross-port switch as shown in FIG. 19. In this 2×2 arrangement each fiber switches between two positions. In configuration I source 1, 1910, is connected to receiver 2, 1950, and source 2, 1920, is connected to receiver 1, 1940. In configuration II the switches are reversed.

A lens may be formed on the end of each of the fibers 1930, or a lens may be attached to the end of each of the fibers 1930. The lens serves to reduce the divergence of the beam with rays 1935, from the fiber 1930, and facilitates the coupling of light rays 1935, between the fibers 1930.

In another embodiment the lens is stationary and not connected to the fibers 1930, with the optical design similar to that shown in FIG. 12, with the fibers located near the focus of the lens and the scanned beam is therefore nearly collimated with nearly zero divergence.

Some optical switches with fiber scanners have a switching time that is small and static positions that are maintained accurately. Because the mass of the fibers is small and the positions of the fibers can be accurately determined the operation of the optical cross port switch shown in FIG. 19 is superior to operation of optical switches based on MEMS mirrors.

Using the fiber scanners described herein, optical cross-port switches of very large numbers of input and output fibers may be constructed using a fiber scanner on each of the input and output fibers. Because the fibers and attached lenses are light weight the switching time can be made small and the actuator forces also can be made small. Because the sensor information for the compound angle scan can be accurate the servo control of the position for a large number of fiber switch configurations can be accurate.

Figure 20:
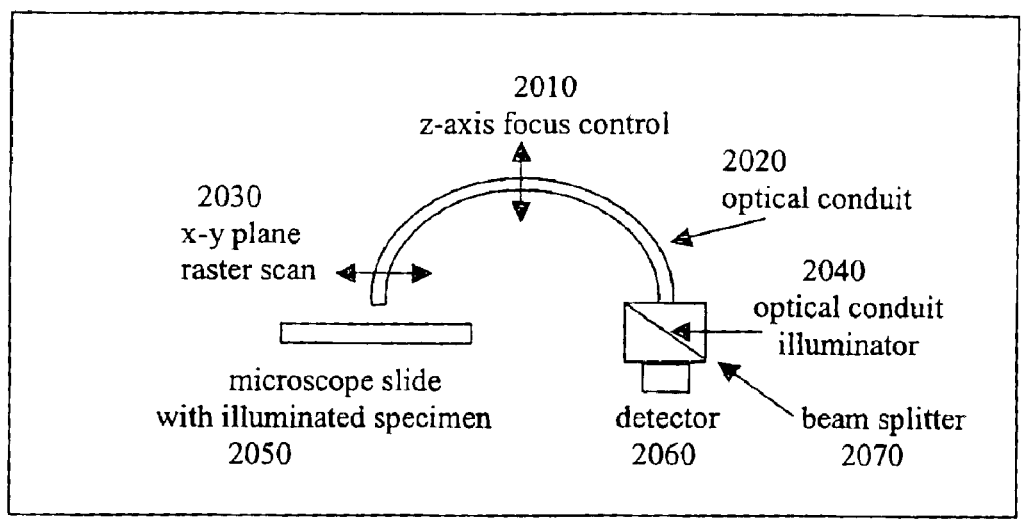
FIG. 20 shows a combination scan pattern for a microscope.

Combination Scanner Embodiments:

A combination scanner can be used in an embodiment of a large divergence beam (high magnification) optical microscope. It is attractive to scan, with a scanner 2030, the optical conduit 2020, over the specimen 2050, in a raster pattern in the x-y plane as shown in FIG. 20. The z axis is the focus axis and the optical conduit 2020, can be moved in the z axis using actuators 2010, as shown in FIG. 20. The z axis motion 2010, can also compensate for small defocus errors caused by the tendency of the optical conduit tip to trace a circular arc in the x-z plane during the x-y raster scan. In addition, the z-axis motion 2010, can be used to focus the microscope.

The optical conduit 2020, may be tapered to a small hole at the specimen 2050, with dimensions less than a micron allowing small features on specimens to be examined in detail with performance typical of microscope objective lenses that can resolve micron features. While the microscope objective is limited by the diffraction of light to micron size, the optical conduit is not. For example in "Classical Electrodynamics" by Jackson, 1962 (incorporated by reference) the electric and magnetic fields for apertures smaller than a wavelength of light is discussed. In this limit the resolution of the microscope is limited by the intensity of the light and the ability to detect small signals returning from the specimen.

FIG. 20 shows a photodetector 2060, used to measure the light signals coming from the specimen 2050. The specimen 2050, as with a conventional microscope, can be illuminated by reflecting light off the specimen or by transmitting light through the specimen. The optical conduit illuminator 2040 can also serve to illuminate the specimen 2050, by using a beam splitter 2070, to insert light into the optical conduit 2020. A high intensity laser can be focussed into the optical conduit 2020, providing a large illumination signal.

A number of techniques can extend the detector 2060, sensitivity to near the limit of counting single photons for the signal coming from the specimen 2050, back through the optical conduit 2020, to the detector 2060. Typical sensitive detection methods are based on using frequency modulation of the illumination and synchronized detection. Other methods of detection are also applicable such as coherent heterodyne detection which can distinguish between photons retro-reflected in the fiber and photons coming from the specimen. An example of an advanced coherent heterodyne imaging system employing synchronous detection and a coherent time gate is described in "Laser Heterodyne Imaging For Littoral Water Surveillance", Final Report September 1999, Contract Number 433 14, prepared for the National Defense Center of Excellence for Research in Ocean Sciences, by M. L. Riaziat, G. Benedict, and A. Jeung (incorporated by reference).

The illumination may be polarized, and in another embodiment the optical conduit 2020, may be an optical fiber that transmits polarized light.

Figure 21:
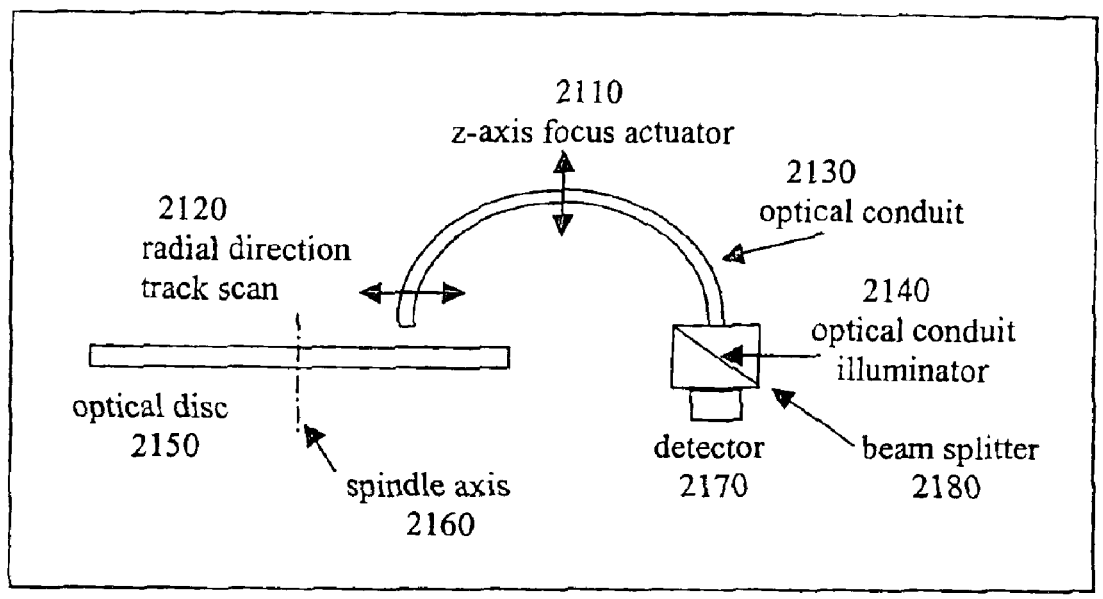
FIG. 21 shows a combination scan pattern for an optical disc head.

An application very similar to the above mentioned microscope is a scanner for an optical disc player "head" or recorder "head", shown in FIG. 21. The same diode laser used in an optical disc player "head" may now be used as the optical conduit illuminator 2140, and is coupled into the optical conduit 2130, with the returning signal from the optical disc 2150, converted into a voltage by the detector 2170, that depends on the digital information contained in the optical disc 2150. It requires less actuation force to move the optical conduit 2130, as compared with an optical disc "head that typically contains the diode laser, and detectors for the signal, the tracking servo detectors and the focus servo detectors. The tracking servo detectors track, for example, the pre-format information on the optical disc.

Figure 22:
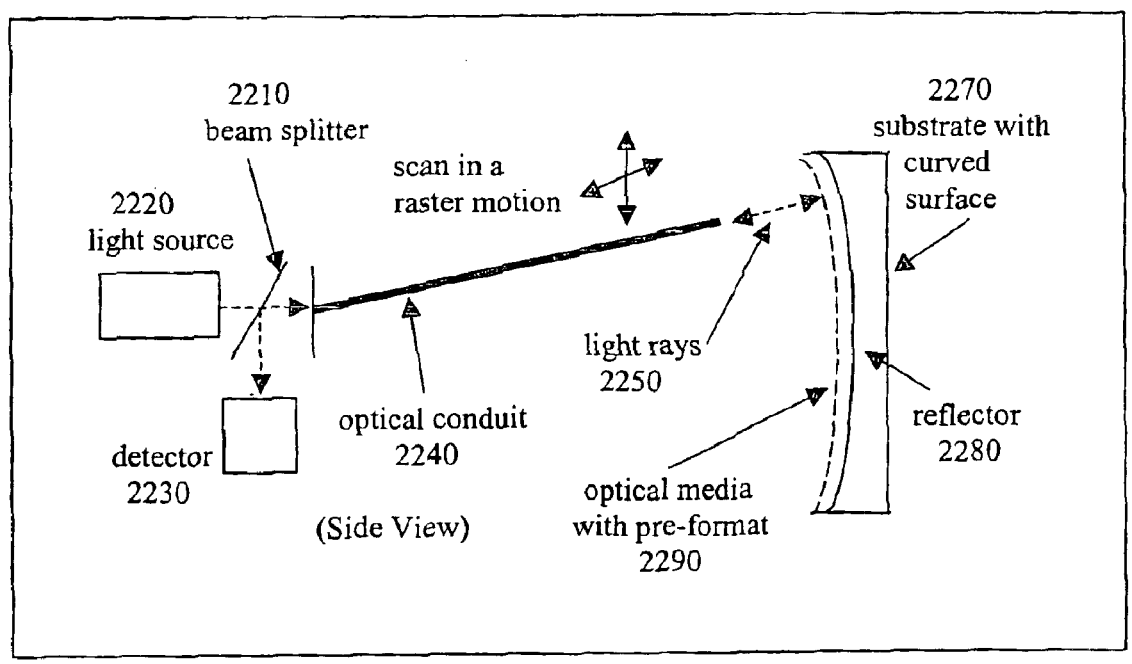
FIG. 22 shows an optical storage device.

An embodiment for the optical disc player/recorder itself using the optical conduit scanner is shown in FIG. 22. In this embodiment the optical recording media 2290, and a reflector 2280, are coated on a substrate with a spherical surface 2270, allowing the optical conduit to scan the entire area of the optical media 2290, while maintaining the same separation between the optical conduit tip of fiber 2240, and the optical media 2290. If the distance of the light rays 2250, path is small then the spot size resolvable on the optical media is comparable to the spot size of the optical conduit tip.

In FIG. 22, the light source 2220 may be a typical laser diode used in optical disc players, and the beam from the laser diode is coupled into the optical conduit 2240. The light returning from the optical conduit 2240, is partially reflected by the beam splitter 2210, and received by the detector 2230. The received light contains the digital information at each spot location on the optical media 2290, and also includes the pre-format information providing the track identifier, and the tracking sensor signal which can be identical to the standard tracking signals used in the pre-format information of optical discs. If the area of the optical media 2290, is about 50 mm by 50 mm and the spot size of the optical conduit tip of optical conduit 2240, is about ½ micron diameter, then 10 billion spots of digital information may be addressed by this optical memory device.

Multiple optical conduits, light sources, and detectors can be used to improve the servo control, the data rate, and the storage capacity of this optical memory.

Figure 23:
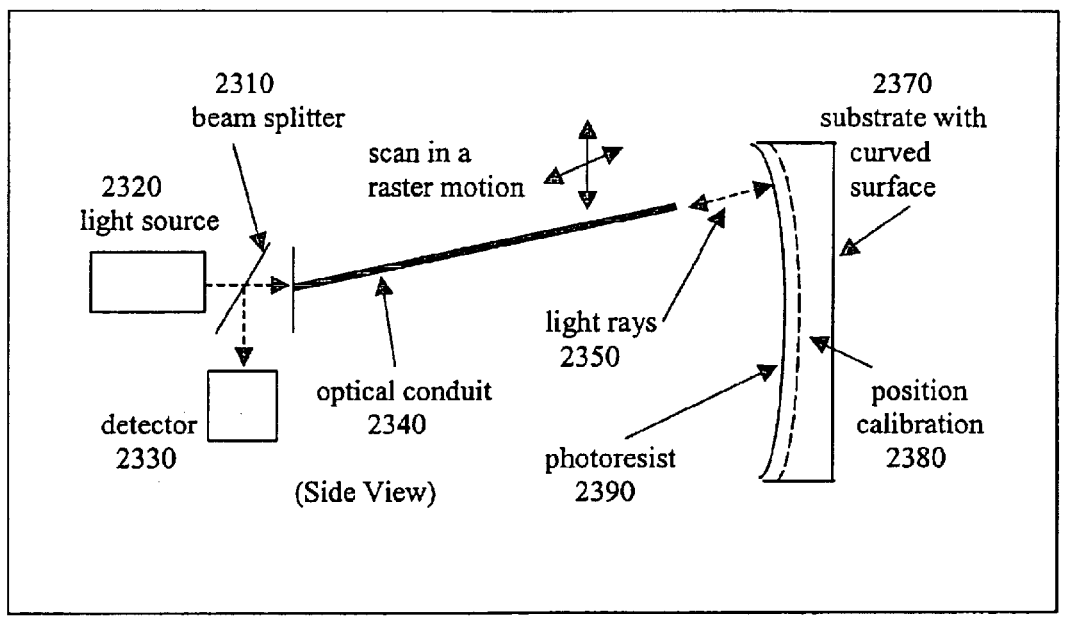
FIG. 23 shows an optical lithography system.

Finally, an optical lithography system is discussed that utilizes a scanning optical conduit shown in FIG. 23. The light source is typically a laser that writes a pattern on the photosensitive material referred to as photoresist. Processing the photoresist then produces a pattern, for example an electrical circuit pattern, by either removing the exposed photoresist material or removing the unexposed photoresist material.

The light source 2320 may be an Argon ion laser typically operating in the blue at 457 nanometers wavelength, for example where a suitable photoresist material exists. An excimer laser is also typically used at shorter wavelengths ranging from the vacuum ultraviolet at 157 nanometers to 351 nanometers in the ultraviolet, allowing higher resolution patterns to be exposed on suitable photoresist materials. As discussed previously and shown in FIG. 14, the optical conduit scanner apparatus can be operated in a vacuum.

The optical conduit 2340, may be a fiber optic for conveying light above about 200 nm or a hollow light pipe for conveying light in the vacuum. The rays 2350, that leave the conduit expose the photoresist. Rays 2350, reflecting off the curved surface which may be either a spherical or cylindrical surface allowing the optical conduit to maintain a fixed and small distance to the surface 2370, that also has position calibration information 2380, on it. Rays 2350, reflecting off the curved surface with the position calibration information now re-enter the distal end of the optical conduit 2340. These rays continue back down the optical conduit 2340, and are reflected off beam splitter 2310, to detector 2330. The detector may now provide the controller of the optical conduit 2340, with sufficient position information so the position of the exposing light rays 2350 is known on the photoresist 2390. The light source 2310, is then turned on to a proper intensity level to expose the photoresist 2390.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A display apparatus, comprising:
   a first set of light sources generating at least a first set of beams;
   a second set of light sources generating at least a second set of beams;
   one or more optical conduits conveying at least the first set of beams;
   a screen optically coupled at least to the one or more optical conduits;
   one or more actuators connected to at least the one or more optical conduits;
   one or more motivators at least partly inducing motion in at least the one or more actuators, the one or more optical conduits connected to the one or more actuators, and the first set of beams exiting distal ends of the one or more optical conduits;

one or more patterned optical elements encoding at least positions of the one or more optical conduits on at least part of at least the second set of beams;

one or more servos driving at least the one or more motivators at least partly in response to at least the encoded positions on the second set of beams; and one or more controllers electrically connected to at least the first set of light sources and electrically connected to at least the one or more servos, wherein the first set of light sources is modulated at least in intensity by at least the one or more controllers, thereby producing a picture display on the screen.

2. The apparatus of claim 1, wherein the one or more servos drive the one or more motivators to generate a raster scan pattern of distal ends of the one or more optical conduits.

3. A display apparatus, comprising:

a first set of light sources generating at least a first set of beams;

a second set of light sources generating at least a second set of beams;

one or more optical conduits conveying at least the first set of beams;

a screen optically coupled at least to the one or more optical conduits;

one or more patterned optical elements encoding at least positions of the one or more optical conduits on at least part of at least the second set of beams; and one or more servos at least partly inducing motion in at least the one or more optical conduits and the first set of beams exiting distal ends of the one or more optical conduit, at least partly in response to at least the encoded positions on the second set of beams.

4. An optical lithography apparatus, comprising:

a set of light sources generating at least a set of beams;

one or more optical conduits conveying at least the set of beams;

one or more actuators connected to at least the one or more optical conduits;

one or more motivators at least partly inducing motion in at least the one or more actuators, the one or more optical conduits connected to the one or more actuators, and the set of beams exiting distal ends of the one or more optical conduits;

one or more photoresist media each including:
a substrate surface;
a photoresist material on the substrate surface; and
one or more patterned optical elements encoding at least positions of the one or more optical conduits on at least part of at least the set of beams exiting distal ends of the one or more optical conduits,
wherein the one or more photoresist media are optically coupled to at least the set of beams exiting distal ends of the optical conduits;

one or more servos driving at least the one or more motivators at least partly in response to at least the encoded positions on the set of beams;

one or more beam splitters optically coupled to at least the one or more optical conduits; and one or more detectors optically coupled to at least the one or more beam splitters, wherein the set of beams is optically coupled to at least the one or more photoresist media and optically coupled to at least the one or more detectors, thereby producing at least one or more signals at at least the one or more detectors in response to at least one or more positions at the one or more photoresist media and in response to at least optical properties of the one or more photoresist media at the one or more positions, and thereby exposing one or more lithographic patterns on the one or more photoresist media.

5. The apparatus of claim 4, wherein the substrate surface is spherical.

6. The apparatus of claim 4, wherein the substrate surface is cylindrical.

7. The apparatus of claim 4, wherein producing one or more signals at the one or more detectors in response to one or more positions at the one or more photoresist media, includes producing one or more signals at the one or more detectors in response to one or more positions of the position calibration pattern.

8. The apparatus of claim 4, wherein the one or more light sources includes one or more lasers.

9. The apparatus of claim 8, wherein the one or more lasers includes one or more excimer lasers.

10. The apparatus of claim 8, wherein the one or more lasers includes one or more Argon ion lasers.

11. The apparatus of claim 4, wherein the one or more servos drive the one or more motivators to generate a combination of a raster scan pattern and a vector scan pattern of distal ends of the one or more optical conduits.

12. The apparatus of claim 11, further comprising:

a controller receiving electrical signals representing the combination of the raster scan pattern and the vector scan pattern and receiving the one or more electrical signals produced by the one or more detectors, and writing a lithographic pattern on the photoresist media.

13. An optical lithography apparatus, comprising:

a set of light sources generating at least a set of beams;

one or more optical conduits conveying at least the set of beams;

one or more photoresist media each including:
a photoresist material; and
one or more patterned optical elements encoding at least positions of the one or more optical conduits on at least part of at least the set of beams exiting distal ends of the one or more optical conduits,
wherein the one or more photoresist media are optically coupled to at least the set of beams exiting distal ends of the optical conduits; and one or more servos at least partly inducing motion in at least the one or more optical conduits and the set of beams exiting distal ends of the one or more optical conduits, at least partly in response to at least the encoded positions on the set of beams, wherein the set of beams is optically coupled to at least the one or more photoresist media, thereby producing at least one or more signals in response to at least one the one or more photoresist media, and thereby exposing one or more lithographic patterns on the one or more photoresist media.

* * * * *